US 8,673,025 B1

(12) United States Patent
Wong

(10) Patent No.: US 8,673,025 B1
(45) Date of Patent: Mar. 18, 2014

(54) WET ELECTROLYTIC CAPACITOR AND METHOD FOR FABRICATING OF IMPROVED ELECTROLYTIC CAPACITOR CATHODE

(75) Inventor: James Wong, Wayland, MA (US)

(73) Assignee: Composite Materials Technology, Inc., Shrewsbury, MA (US)

( * ) Notice: Subject to any disclaimer, the term of this patent is extended or adjusted under 35 U.S.C. 154(b) by 499 days.

(21) Appl. No.: 12/797,440

(22) Filed: Jun. 9, 2010

Related U.S. Application Data

(63) Continuation-in-part of application No. PCT/US2008/086460, filed on Dec. 11, 2008.

(60) Provisional application No. 61/218,885, filed on Jun. 19, 2009.

(51) Int. Cl.
*H01G 9/00* (2006.01)

(52) U.S. Cl.
USPC ........................................................ 29/25.03

(58) Field of Classification Search
None
See application file for complete search history.

(56) References Cited

U.S. PATENT DOCUMENTS

| | | | |
|---|---|---|---|
| 5,001,023 A | 3/1991 | Cheshire et al. | 429/94 |
| 5,869,196 A | 2/1999 | Wong et al. | 428/613 |
| 6,416,603 B1 | 7/2002 | Nishiyama et al. | 156/89.14 |
| 2003/0039093 A1* | 2/2003 | Tadanobu et al. | 361/503 |
| 2004/0244185 A1 | 12/2004 | Wong | 29/599 |

OTHER PUBLICATIONS

International Search Report, Written Opinion and International Preliminary Report on Patentability, PCT/US08/86460, dated Feb. 6, 2009 and Jun. 29, 2010.

* cited by examiner

*Primary Examiner* — Seahvosh Nikmanesh
(74) *Attorney, Agent, or Firm* — Hayes Soloway P.C.

(57) ABSTRACT

A process for making a valve metal material useful for forming electrolytic devices comprising the steps of: establishing multiple tantalum or niobium components in a billet of a ductile material; working the billet to a series of reduction steps to form said tantalum or niobium components into elongated elements; cutting the resulting elongated elements and leaching the ductile metal from the elements; washing and mixing the cut elements; and forming the cut elements into a sheet. The resulting sheet may be formed into anodes and cathodes and assembled to form a wet electrolytic capacitor.

7 Claims, 2 Drawing Sheets

US 8,673,025 B1

WET ELECTROLYTIC CAPACITOR AND METHOD FOR FABRICATING OF IMPROVED ELECTROLYTIC CAPACITOR CATHODE

CROSS REFERENCE TO RELATED APPLICATION

This application is a CIP of the yet to be filed National Phase of PCT/US08/86460 filed Dec. 11, 2008, the contents of which are incorporated herein by reference. This application also claims priority from U.S. Provisional Application Ser. No. 61/218,885, filed Jun. 19, 2009.

BACKGROUND OF THE INVENTION

In my aforesaid parent application, I describe production of tantalum and niobium-based materials useful as electrolytic capacitor anodes. As described in my aforesaid parent application, tantalum-based electrolytic capacitors have found increasing use in microelectronics. The combination of small package size, insensitivity to operating temperature, and excellent reliability have made them the choice over ceramic multilayer and aluminum foil-based capacitors for many applications. As the state of the art in microelectronics continues to progress, demand has grown for more efficient tantalum electrolytic capacitors.

An electrolytic capacitor consists of three basic components: an anode, a cathode, and an electrolyte. Heretofore, electrolytic tantalum anodes have primarily been fabricated using fine particle tantalum powder. The powder is pressed into a green compact (20 to 50 percent dense) and is sintered under vacuum at a temperature of 1500°-2000° C. for 15-30 minutes to form a porous, mechanically robust body in which the tantalum is electrically continuous. The sintering process is, in some cases, relied upon to attach a lead wire to the compact. In these cases, the lead is inserted into the green compact prior to sintering. If the lead is not attached in this manner, it usually will be welded into place immediately following sintering of the compact. An important ancillary benefit of the sintering operation is purification of the tantalum particle surfaces; impurities, such as oxygen, are driven off.

After sintering, the compact is anodized to form the dielectric tantalum pentoxide ($Ta_2O_5$) on the exposed surfaces. The porous regions of the anodized compact are then infiltrated with a conductive electrolyte. The electrolyte may be of the "solid" or "wet" type. Depending upon the application, a wet electrolytic capacitor may offer advantages over a solid electrolytic capacitor. Wet electrolytic capacitors tend to be larger than solid electrolytic capacitors and can offer higher capacitance as a result. This is desirable, since what is needed in many modern applications are capacitors with high energy densities, which are driven in part by anode capacitance and in part by cathode capacitance. This is due to the relationship between these two capacitances and the overall capacitance in a wet cell electrolytic capacitor. The overall capacitor consists of the anode and the cathode connected in series as two capacitors, and resulting in the relation:

$$C_{cap} = 1/((1/C_{anod}) + (1/C_{cath}))$$

Where $C_{cap}$ is the overall capacitance, $C_{anod}$ is the capacitance of the anode, and $C_{cath}$ is the capacitance of the cathode (see, e.g., D. M. Edson and J. S. Bates, "Electrical Properties of a Novel High CV Wet Tantalum Capacitor System", CARTS USA 2009 Proceedings, The 29th Annual Passive Components Symposium & Exhibition, pp. 415-425, Electronic Components Association, Arlington, Va., 2009). It is clear from this equation that as the value of $C_{cath}$ increases, $1/C_{cath}$ tends to small values (zero in the limit where $C_{cath}$ tends to infinity), and $C_{cap}$ is dominated by $C_{anod}$. For this reason, wet electrolytic capacitor manufacturers desire cathodes with the highest capacitance possible.

The conventional path to cathode fabrication for wet electrolytic capacitors is essentially the same as that for anode fabrication in that it involves pressing tantalum metal powders, sintering them into a porous structure, and then anodizing the structure to form tantalum pentoxide dielectric on the exposed surfaces. In principle, fabrication of very high capacitance cathodes is not difficult, since this may be achieved by simply making cathodes that have much greater surface area than do the anodes. In practice, however, there are packaging restrictions on the capacitor. A typical wet capacitor configuration will involve a central anode surrounded by a tantalum container, or "can". The tantalum powders of the cathode are sintered so as to form a sleeve that fits inside the can, and the sleeve is then sintered to the can. A thin oxide layer is formed on this structure and the cathode is complete. An anode/cathode assembly of this type is specified in U.S. military document Mil-PRF-39006.

The capacitance of the cathode in this type of capacitor relies primarily upon the surface area available in the tantalum sleeve. Higher surface area translates into higher capacitance. If the sleeve is comprised of powders, as is usually the case, the powders must be very fine and/or aspected into flakes by such means as ball milling. As discussed below, the use of such powders and flakes can have serious drawbacks.

In my aforesaid parent application, I describe fabrication of improved electrolytic capacitor anode material by establishing multiple valve metal components, preferably tantalum or niobium, in a billet of a differing ductile metal, working the billet through a series of reduction steps to form the valve metal components into elongated elements, cutting the resulting elongated elements into sections, leaching the secondary ductile metal from the sections, washing and mixing the resulting valve metal filaments leached from the sections, and forming the filaments into a sheet useful for forming anodes. In accordance with the present invention, I have now found that tantalum-based electrolytic anode bodies formed as above advantageously may also be used as cathode bodies in high CV wet tantalum capacitors.

POWDER MANUFACTURING

State of the art tantalum powder is produced by the sodium reduction process of $K_2TaF_7$. Improvements in the process have resulted in commercially available powders capable of yielding a specific capacitance of over 50,000 CV/g. Better control of input tantalum particle size, reaction temperature, and other variables has led to the improvements in specific capacitance. A key advance was the introduction of doping agents that enabled the production of very high specific capacitance powders. The doping agents serve to prevent surface loss during sintering. Typical additives are nitrogen, oxygen, sulfur, and phosphorus compounds in the range from 50 to 500 ppm. While select dopants are beneficial, it is important to limit other contamination, which can weaken the dielectric film or even prevent the formation of a continuous $Ta_2O_5$ layer that could lead to premature breakdown of the dielectric film and loss of capacitance.

Higher capacitance tantalum particles have been obtained by ball milling powders. Ball milling turns the roughly spherical powder particles into flakes. The benefit is that the flakes can have a higher specific capacitance at higher formation voltage than powder particles. This translates into greater volumetric efficiency for the flakes when they are formed into anodes or cathodes. Aspecting tantalum particles by ball milling and other processes aimed at improving powder performance, while effective, has practical drawbacks, including increased manufacturing costs and a marked decrease in product yield. Currently, a premium of 2-3 times is charged for the very highest capacitance flakes over standard powder product.

The very fine tantalum powders commercially available today have several serious problems with respect to anode and cathode fabrication. One significant problem in particular is a sensitivity to surface area loss during sintering. Ideal sintering conditions are high temperatures and short times. A higher temperature serves to purify the tantalum surface and provide a mechanically strong compact. Capacitors having lower equivalent series resistance (ESR) and equivalent series inductance (ESL) can be fabricated if higher sintering temperatures are employed. Unfortunately, the fine particles of high capacitance powders and flakes lose surface area at temperatures over 1500° C. A loss of surface area results in lower capacitance, reducing the benefit of using the higher specific capacitance powder. The capacitor manufacturer must balance sintering temperature, mechanical properties, and ESR and ESL levels in order to maximize capacitor performance.

Fine powders and flakes are also sensitive to forming voltage during anodization. The anodization process consumes some of the metallic tantalum to form the dielectric layer. As the forming voltage increases, more of the tantalum is consumed, resulting in a loss of capacitance. As the powder becomes finer, this problem becomes increasingly serious.

In practice today, high surface area powders used in capacitor anodes are sintered at low temperatures (below 1500° C.) and are anodized at voltages below 50 volts. Most of these capacitors are restricted to operating voltages below 16 volts.

Another drawback to fine powders is "tortuousity", which can lead to poor electrolyte fill factor. As particle size is reduced, the pathways that the electrolyte must follow to infiltrate the compact grow increasingly narrow and more convoluted, or tortuous. Eventually, it becomes extremely difficult, if not impossible, to completely infiltrate the compact. Incomplete infiltration results in lower capacitance.

A final difficulty in using high specific capacitance tantalum powders is their poor flowability. In state of the art capacitor manufacturing processes, tantalum powder is metered into a die for pressing into the green compact. It is very important that the metering process is accurate and reliable in order that each capacitor manufactured contains the same quantity of powder. Flakes and highly aspected powders tend not to flow uniformly, which can lead to large variability in production runs.

Although fine tantalum powders and flakes are subject to the problems briefly discussed above, the problem of sensitivity to anodization conditions comes into play primarily for anode fabrication. The demands placed upon cathodes are not as restrictive, The central requirement for the cathode in wet electrolytic capacitors is high capacitance The dielectric layer on the anode must be fairly thick in order to prevent breakdown of the layer and capacitor failure during operation. This is due to the fact that the anode holds the electric charge of the capacitor. If the dielectric layer is too thin, it can break down and allow the charge to escape to the cathode. Since the cathode does not store charge, its dielectric layer can be comparatively thin; the function of the dielectric layer on the cathode is only to enhance its capacitance. The fact that the dielectric layer on the cathode can be relatively thin means that little tantalum is consumed during anodization. This in turn means that a given tantalum particle can be quite small without being consumed, ensuring high surface area in the cathode.

FIBER PRODUCTION

In my prior U.S. Pat. No. 5,034,857, I disclose an approach to the production of very fine valve metal filaments, preferably tantalum, for capacitor use. The benefits of fine filaments relative to fine powders are higher purity, lower cost, uniformity of cross section, and ease of dielectric infiltration, while still maintaining high surface area for anodization. The uniformity of cross section results in capacitors with high specific capacitance, lower ESR and ESL, and less sensitivity to forming voltage and sintering temperature as compared to fine powder compacts.

As disclosed in my aforesaid '857 U.S. patent, valve metal filaments, preferably tantalum, are fabricated through the combination of the filaments with a ductile metal so as to form a billet. The second, ductile metal is different from the metal that forms the filaments. The filaments are substantially parallel, and are separated from each other and from the billet surface by the second, ductile metal. The billet is reduced by conventional means—e.g., extrusion and wire drawing—to the point where the filament diameter is in the range of 0.2 to 5.0 microns in diameter. At that point, the second, ductile metal is removed, preferably by leaching in mineral acids, leaving the valve metal filaments intact. The filaments are suitable for use in tantalum capacitor fabrication.

Other patents involving valve metal filaments and fibers, their fabrication, or articles made therefrom include U.S. Pat. Nos. 3,277,564, (Webber), 3,379,000 (Webber), 3,394,213, (Roberts), 3,567,407 (Yoblin), 3,698,863 (Roberts), 3,742, 369 (Douglass), 4,502,884 (Fife), 5,217,526 (Fife), 5,306, 462 (Fife), 5,284,531 (Fife), and 5,245,514 (Fife).

See also my earlier U.S. Pat. No. 5,869,196 in which I describe a process for fabrication of fine-valve metal filaments for use as porous metal compacts used in the manufacture of electrolytic capacitors. According to my '196 U.S. patent, a metal billet consisting of multiple filaments of a valve metal, preferably tantalum, is contained within and spaced apart by a ductile metal, preferably copper. The billet is reduced by conventional means, such as extrusion and wire drawing, the resulting composite product is cut into lengths, and the ductile metal separating the valve metal components is removed by leaching in acid. A similar compaction technique has been proposed to fabricate composites by providing continuous layers of tantalum and copper sheets layered together in a jellyroll. The jellyroll is then reduced to a small size by extrusion and drawing. Starting with sheets of tantalum and copper offers advantages over working with filaments. However, at reduced sizes, the copper cannot readily be leached out due to the presence of the continuous tantalum layers.

In my co-pending U.S. application Ser. No. 11/859,687 I describe improvements over the prior art much as described in my '196 U.S. patent by creating one or more open slots in the starting billet stage and filling the slots with ductile metal prior to extrusion and drawing. After extrusion and drawing to small size, the slots remain. As a result, the ductile metal readily may be leached and removed from between the tantalum layers. The resulting product is a series of compacted tantalum layers each progressively of smaller width. In one embodiment of the invention, continuous layers of tantalum and copper are layered together in a jellyroll and formed into a billet which is circular in cross-section, and the slots are concentrically evenly spaced radially around the billet. The resulting product is a series of concentric split tubes each progressively of smaller diameter towards the center.

As described in my '687 application, employing a foil or sheet of tantalum as opposed to filaments greatly simplifies assembly of the billet. Employing sheet tantalum also ensures greater uniformity since the thickness of the starting sheet can be controlled more readily than using a multiple of separate filaments. This in turn produces substantially more uniform capacitor material resulting in substantially higher values of CV/g.

SUMMARY OF THE INVENTION

I have now found that the process described in my aforesaid parent application advantageously may be used to form cathodes for wet tantalum capacitor systems by cutting conventional valve metal filaments or wires in a ductile metal matrix into short segments, leaching out the ductile metal so as to leave the short valve metal filaments intact, and forming or casting the valve metal filaments into a thin sheet from a slurry. In a preferred embodiment of my invention, the valve metal comprises tantalum while the ductile metal comprises copper, and the tantalum fibers are cast in the form of a thin sheet from an aqueous slurry using a continuous Doctor Blade casting method.

BRIEF DESCRIPTION OF THE DRAWINGS

Further features and advantages of the present invention will be seen from the following detailed description taken in conjunction with the accompanying drawings, wherein.

DETAILED DESCRIPTION

Figure 1:
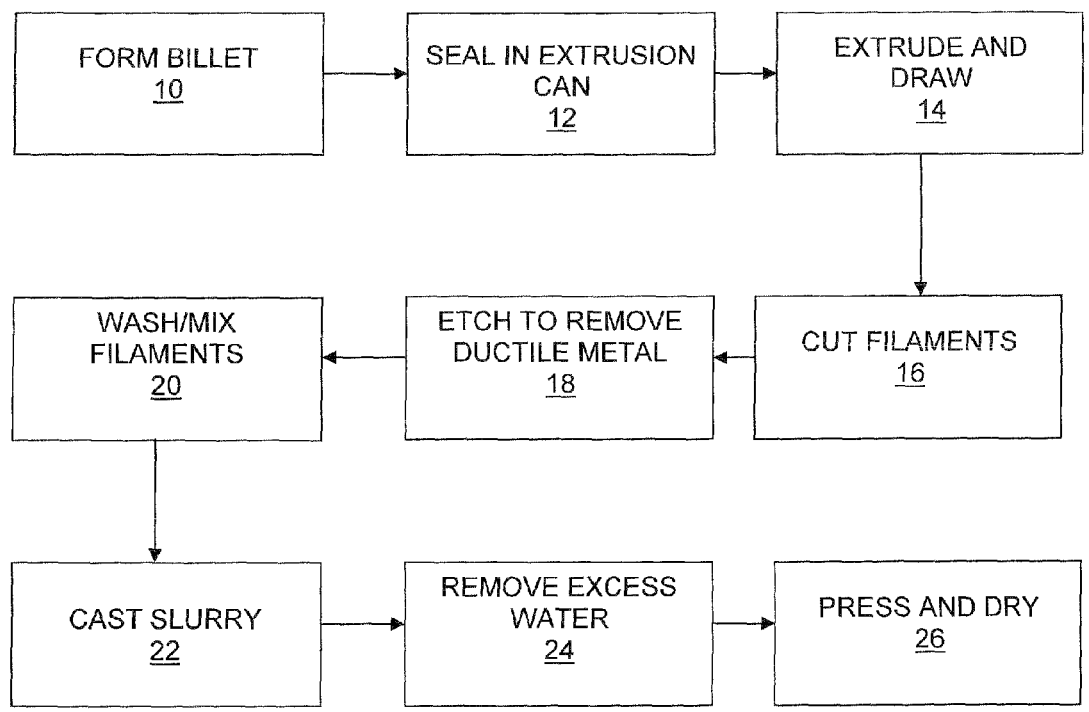
FIG. 1 is a schematic block diagram of the process of the present invention.
Figure 2:
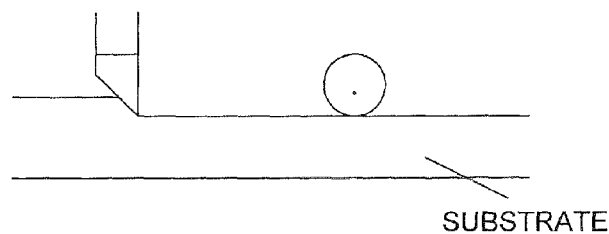
FIG. 2 is a simplified side elevational view showing casting of a sheet in accordance with the present invention.

Referring to FIGS. 1 and 2, the process starts with the fabrication of valve metal filaments, preferably tantalum, by combining filaments or wires of tantalum with a ductile material, such as copper to form a billet at step 10. The billet is then sealed in an extrusion can in step 12, and extruded and drawn in step 14 following the teachings of my '196 U.S. patent. The extruded and drawn filaments are then cut or chopped into short segments, typically $1/16^{th}$-$1/4^{th}$ inch long at a chopping station 16. Preferably the cut filaments all have approximately the same length. Actually, the more uniform the filament, the better. The chopped filaments are then passed to an etching station 18 where the ductile metal is leached away using a suitable acid. For example, where copper is the ductile metal, the etchant may comprise nitric acid.

Etching in acid removes the copper from between the tantalum filaments. After etching, one is left with a plurality of short filaments of tantalum. The tantalum filaments are then washed in water in a washing station 20, and the wash water is partially decanted to leave a slurry of tantalum filaments in water. The slurry of tantalum filaments in water is then cast as a thin sheet using, for example, a Doctor Blade at casting station 22. Excess water is removed, for example, by rolling at a rolling station 24. The resulting mat is then further compressed and dried at a drying station 26.

As an alternative to "Doctor Blade formation", the thin sheet may be formed by spray casting the slurry onto to a substrate, excess water removed and the resulting mat pressed and dried as before.

There results a thin sheet of tantalum fibers substantially uniform in thickness.

As reported in my aforesaid parent application, an aqueous slurry of chopped filaments will adhere together sufficiently so that the fibers may be cast as a sheet which can be pressed and dried into a stable mat. This is surprising in that the metal filaments themselves do not absorb water. Notwithstanding, as long as the filaments are not substantially thicker than about 10 microns, they tend to adhere together. On the other hand, if the filaments are much larger than about 10 microns, they will not form a stable mat. Thus, it is preferred that the filaments have a thickness of less than about 10 microns, and preferably below 1 micron thick. To ensure an even distribution of the filaments, and thus ensure production of a uniform mat, the slurry preferably is subjected to vigorous mixing by mechanical stirring or vibration.

The density of the resulting tantalum sheet may be varied simply by changing the final thickness of the sheet.

Also, if desired, multiple layers may be stacked to form thicker cathodes that may be desired, for example, for high capacitance applications.

Figure 3:
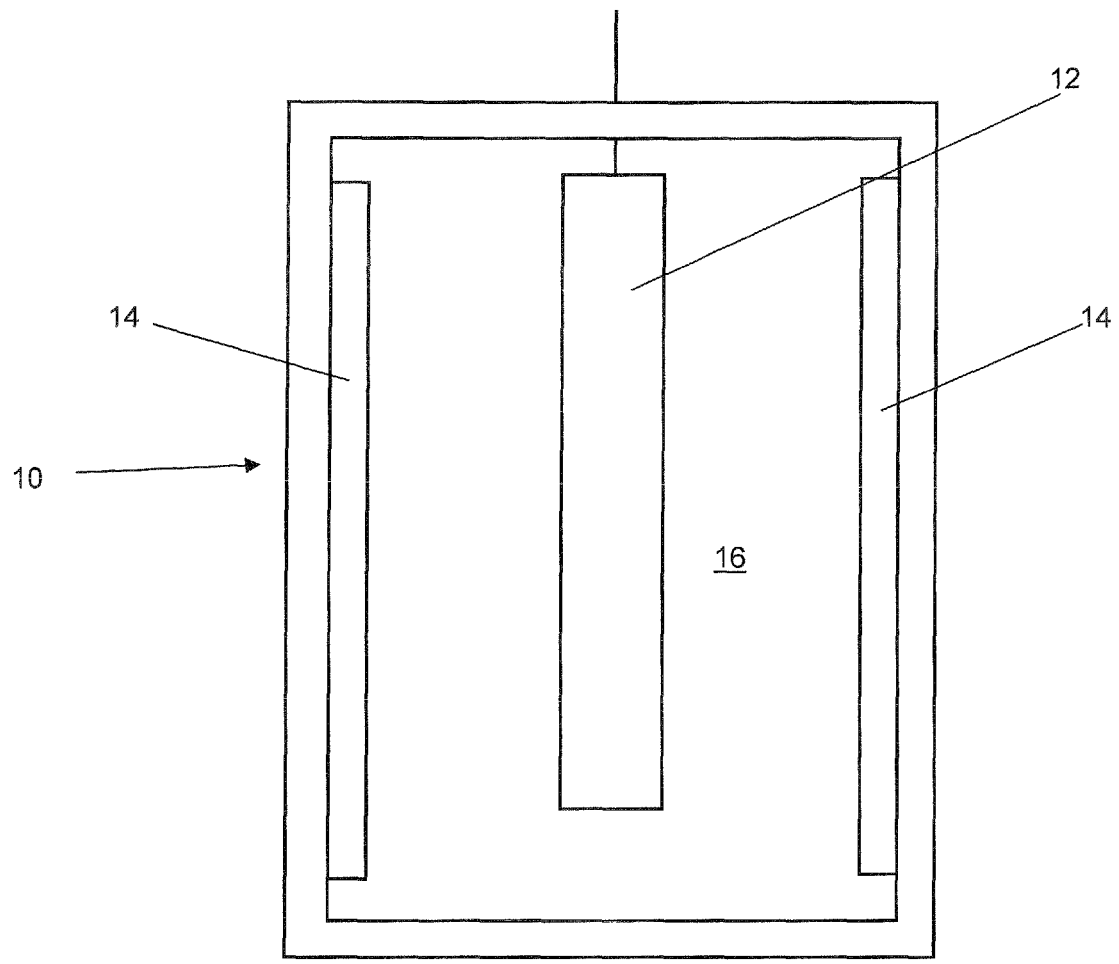
FIG. 3 is a cross-sectional view of a wet electrolytic capacitor in accordance with the present invention.

Referring to FIG. 3, a wet electrolytic capacitor 10 made in accordance with the present invention includes an electrolyte 12 disposed between an anode 14 and cathode 16. Anode 14 and cathode 16 are made from compacted tantalum or niobium components formed as above described.

ADVANTAGES OF THE INVENTION

The present invention provides several advantages over the prior art including:
(1) The invention allows for large-scale manufacturing or capacitor cathodes using conventional sheet forming equipment.
(2) The resulting sheets are flexible and have sufficient strength to permit further handling.
(3) Consistent and reliable CV/g values also can be achieved due to uniformity dispersion of the tantalum elements.
(4) The process ensures cross-sectional uniformity and high surface-to-volume ratio. Both factors are important for reliable fabrication of high capacitance capacitors on an industrial scale.
(5) The process is flexible. By modifying the thickness of the mat, we can vary the amount of tantalum/unit volume of the resulting product.
(6) The process is economical as compared to existing processes employing powders.
(7) The process ensures uniform density. As a result, multiple layers may be stacked for high capacitance applications.
(8) The process provides high yield, low cost per unit, and consistent results.

While the invention has been described in connection with the use of tantalum disposed within a copper matrix, valve metals other than tantalum, such as niobium, an alloy of tantalum or niobium, hafnium, titanium, and aluminum can be used. Similarly, ductile metal matrix materials other than copper, such as copper-based alloys, may also be successfully employed in the practice of the invention. Still other changes may be made without departing from the spirit and scope of the invention.

The invention claimed is:

1. A process for making valve metal material useful for forming electrolytic devices comprising the steps of:
    (a) establishing multiple tantalum or niobium components in a billet of a ductile material;
    (b) working the billet to a series of reduction steps to form said tantalum or niobium components into elongated elements;
    (c) cutting the elongated elements from step b) into filaments not larger than about 10 microns, and leaching the ductile metal from the elements;
    (d) washing the cut elements from step c) with water with mixing to form a slurry in which the filaments are evenly distributed; and
    (e) forming the cut elements from step d) by casting into a stable sheet.

2. The process of claim 1, wherein said leaching is in an acid etchant.

3. The process of claim 2, wherein the components are tantalum, and the acid etchant is nitric acid.

4. The process of claim 1, wherein the sheet is formed by Doctor Blading.

5. The process of claim 4, including the step of rolling the sheet after Doctor Blading to remove excess water.

6. The process of claim 5, including the step of pressing and drying the sheet after rolling.

7. The process of claim 1, wherein cathodes for wet electrolytic capacitors are formed.

\* \* \* \* \*